Nov. 21, 1950  O. E. DE LANGE  2,531,201
ELECTRONIC CONTROL CIRCUITS FOR RADAR SYSTEMS
Filed June 28, 1946  2 Sheets-Sheet 1
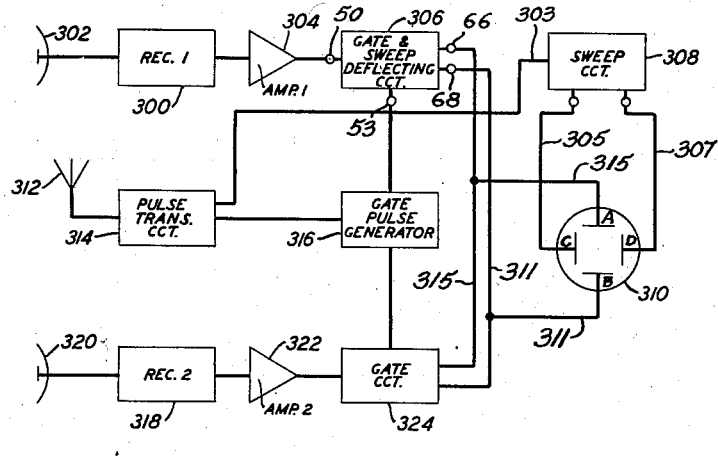
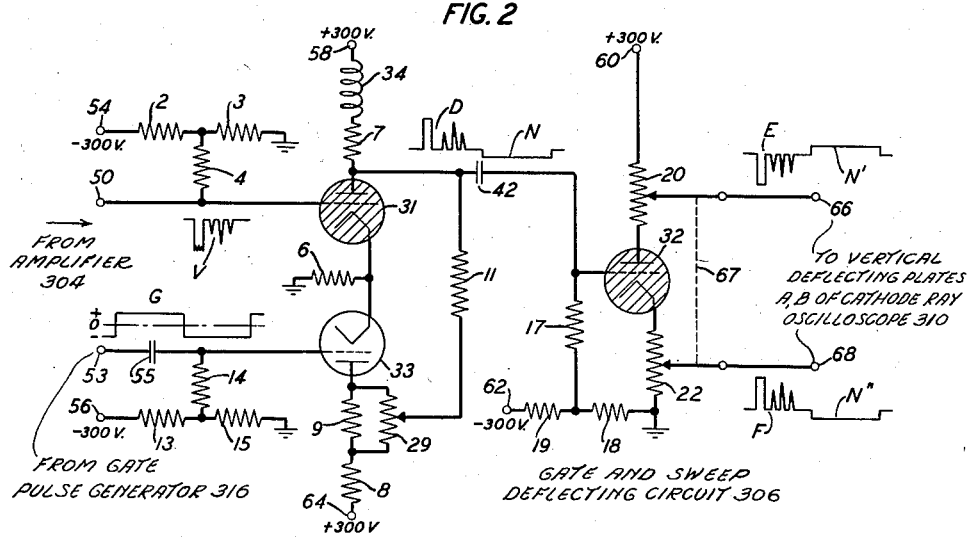
INVENTOR
O. E. DE LANGE
BY
ATTORNEY Nov. 21, 1950     O. E. DE LANGE     2,531,201
ELECTRONIC CONTROL CIRCUITS FOR RADAR SYSTEMS
Filed June 28, 1946     2 Sheets-Sheet 2

INVENTOR
O. E. DE LANGE
BY
ATTORNEY

Patented Nov. 21, 1950

2,531,201

UNITED STATES PATENT OFFICE 2,531,201

ELECTRONIC CONTROL CIRCUITS FOR RADAR SYSTEMS

Owen E. De Lange, East Orange, N. J., assignor to Bell Telephone Laboratories, Incorporated, New York, N. Y., a corporation of New York Application June 28, 1946, Serial No. 679,998

2 Claims. (Cl. 343—5)

This invention relates to electronic control circuits for use in radar systems. More particularly it relates to circuits employing electronic devices which establish the appropriate initial sweep positioning or sweep deflecting voltages on the deflecting members of a cathode-ray oscilloscope indicator for use in radar systems and the like.

A further feature of the invention is the provision of a video frequency gating circuit which is free from objectionable transient effects.

In the preferred embodiments of the principles of the invention, illustrated in the accompanying drawings, circuits are exemplified which provide video circuit gating and establish appropiate initial sweep positioning or sweep deflecting voltages on the deflecting plates, both horizontal and vertical, of an electrostatic deflection type cathode-ray oscilloscope indicator.

In the embodiments chosen the voltages are established for appropriate operation in a particular type of radar system described in detail below. It is obvious, however, that the principles of the invention can be readily adapted by those skilled in the art for use in numerous other control circuits. The structures indicated are, therefore, clearly selected for illustration only and in no way limit the scope of the invention.

The control circuits of the invention establish the basic deflection control voltages for the oscilloscopic indicator of the radar systems of the invention upon which other deflection voltages including sweep and signal voltages can be superimposed to provide signal patterns embodying the desired information concerning reflecting objects from which reflections of the exploratory pulses emitted by the radar system are received.

A primary object of the invention is to provide a video frequency gating circuit in which objectionable transient effects are eliminated.

A further object of the invention is to provide improved sweep positioning or sweep deflecting circuits for use with cathode-ray oscilloscopes.

Other and further objects will become apparent during the course of the following description and in the appended claims.

The principles of the invention will be more readily understood in connection with the following detailed description of illustrative embodiments thereof, taken in conjunction with the accompanying drawings in which:

Fig. 1 shows, in block diagram form, a radar system employing control circuits of the invention;

Fig. 2 shows in electrical schematic diagram form one embodiment of a control circuit of the invention;

Figure 3:
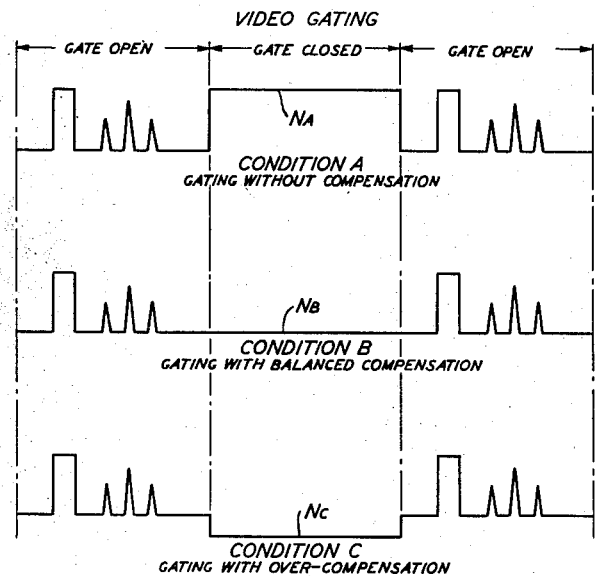
Fig. 3 illustrates in diagrammatic form three types of response which can be obtained by adjustments of the circuit of Fig. 2 as will be described in detail hereinafter; and, Fig. 4 shows in electrical schematic diagram form a second embodiment of a control circuit of the invention.

In more detail in Fig. 1 a pulse transmitter circuit 314 energizes an antenna 312 to emit, periodically, short powerful pulses of electromagnetic or radio wave energy. Circuit 314, in accordance with long accepted practice in the art, includes a modulating or pulsing circuit which energizes a radio transmitter to generate high power pulses at a rate which is normally between 200 to 4000 pulses per second, the major requirement being that reflections from objects at the maximum range to be measured should have ample time to return to the receiving antennas 302 and 320 before the next successive high power pulse is transmitted.

Antenna 312 can preferably be broadly directive or even omnidirectional in the particular system shown in Fig. 1, the essential requirement for it being that the energy emitted from it should cover the area from which reflections are desired or, in other words, the area which it is desired to explore for reflecting objects.

Receiving antennas 302 and 320 are directive antennas adapted to receive reflections from a portion only of the area it is desired to explore each covering, for example, substantially half of said area. They can, of course, be highly directive beam antennas which are recurrently swept through arcs appropriate to cover their respective desired areas.

Reflected pulses from reflecting objects within the respective areas covered by antennas 302 and 320 are received, amplified and detected in receivers 300 and 318, respectively, and the resulting video frequency pulses are further amplified in amplifiers 304 and 322, respectively.

The output of amplifier 304 is connected to terminal 50 of gate and sweep deflecting circuit 306, having output terminals 66, 68, which is shown in electrical schematic diagram form in Fig. 2 and will be described in detail hereinafter.

Synchronizing pulses from the modulator portion of pulse transmitter circuit 314 are furnished to gate pulse generator 316 and via lead 303 to sweep circuit 308 to synchronize their respective operations with the emission of each transmitted pulse.

Gate pulse generator 316 provides a squared gating wave comprising alternate positive and negative squared top pulses, as illustrated by wave G of Fig. 2, for example, the duration of each pulse being substantially identical with the interval between successive high power pulses emitted by transmitter circuit 314. Generator 316 can be of any of the well-known types of square wave generators, for example of the multivibrator type or of the relaxation oscillator type.

The gating wave provided by circuit 316 serves, as will be described in detail in connection with Fig. 2, to alternately open and close the gate circuits 306 and 324, one of said circuits being opened when the other is closed and vice versa, so that received reflected pulses will appear, via leads 311, 315, on the vertical deflecting plates A and B of cathode-ray oscilloscope 310 alternately from antenna 302 and antenna 320.

As will be described presently, circuit 306 is adjusted to provide, in response to the gating wave from generator 316 applied to its terminal 53, a controlled "sweep deflecting" action which displaces the traces for the respective antennas, whereby signals received on one antenna will appear as deflections on one trace and signals received on the other antenna will appear as deflections on a second trace which is distinctly separated and readily distinguished from the first-mentioned trace. Gate circuit 324 can be, as will become apparent hereinunder, similar to circuit 306 except that it is adjusted to omit the sweep deflecting action. It is, of course, arranged, as will be described in further detail hereinafter, to open when gate circuit 306 closes and to close when gate circuit 306 opens.

Sweep circuit 308 provides, via leads 305, 307, a linear sweep on the horizontal deflecting plates C and D of oscilloscope 310. A preferred feature of this circuit is shown in more detail in Fig. 4 and will be described in detail, hereinafter.

In more detail, in the circuit of Fig. 2, vacuum tube 31 functions both as an amplifier and as a limiter of the video signal output of the amplifier 304, which output is applied to terminal 50 of Fig. 2. In the quiescent or standby state, the tube is biased through resistor 4 from voltage divider comprising resistors 2 and 3, so that its control electrode or grid is only about 3 volts above cut-off. It is lightly cross-hatched to denote that it is conducting in its quiescent or standby state. Vacuum tube 33 is biased below cut-off through resistor 14 from voltage divider comprising resistors 13 and 15 so that it does not affect the bias on vacuum tube 31 by the passage of space current through cathode resistor 6 which is, of course, common to vacuum tubes 31 and 33.

Quiescently, approximately 15 milliamperes flow through vacuum tube 31 and the voltage drop across resistor 7 and coil 34 is only about 15 volts. Negative video signals represented, by way of illustration, by the group of pulses V are introduced, via terminal 50, into the control electrode or grid circuit of tube 31, as shown. This group of pulses V represents, by way of example, the video content of a single outgoing pulse from antenna 312 (assuming some direct reception from antenna 312 by antenna 302) followed by three pulses received as reflections of the single outgoing pulse from three reflecting objects at progressively increasing range from antenna 302. The tube 31, obviously, limits by cut-off any negative input voltages over 3 volts and positive video output voltages from its plate or anode cannot exceed 15 volts. Pulse group D represents a typical response in the plate or anode circuit of tube 31 to the input pulse group V. Coil 34 is provided in the plate circuit to improve the high frequency response of the amplifier by the method commonly referred to as "shunt peaking." See, for example, page 251 of "Radio Engineering" by F. E. Terman, published by McGraw-Hill Inc., N. Y., 1947.

The anode of vacuum tube 31 is connected through condenser 42 to the control electrode or grid of vacuum tube 32. Tube 32 is quiescently biased through resistor 17, from the voltage divider comprising resistors 18 and 19 and by the resistance 22 of its cathode circuit so that about 25 milliamperes of current flows. The light cross-hatching of this tube denotes its condition as conducting in its standby state. Tube 32 acts as a "phase-splitter" having equal resistance in its anode and cathode circuits. Equal but oppositely phased (i. e., 180-degrees phase displaced) video signal voltages, E and F, for use in a type A presentation on the cathode-ray oscilloscope are obtained from the anode and cathode circuits. A type A presentation, as is well known in the radar art, comprises the presentation on a linear trace of the pulses received following each transmitted radar pulse. These signal voltages E and F are adjustable in amplitude by means of potentiometers 20 and 22, the controls of which are mechanically connected (or ganged), as denoted by dotted line 67, so that both are moved together.

In response to the positive portions of the gating pulses G which, as mentioned above, occur with every other transmitted pulse and which are applied via terminal 53 to the control electrode or grid of vacuum tube 33, by way of coupling or blocking condenser 55 which isolates tube 33 from direct current, the vacuum tube 33 becomes heavily conducting and the resulting current flow through the common cathode resistor 6 is sufficient to bias vacuum tube 31 below cut-off. Therefore, since the video signals applied to the control grid of vacuum tube 31 are of negative polarity they will be blocked by tube 31, i. e. the gating circuit will close, during the alternate transmitter pulse cycles for which the gating pulse G to vacuum tube 33 is positive. Gate circuit 324 of Fig. 1 is, of course, arranged to open during these intervals and to close or block during the negative portions of the gating pulses.

This can be readily be accomplished by the obvious expedient of inverting the gating wave in a triode phase-inverting circuit and employing the inverted wave to control gate circuit 324. The phase-inverting circuit can conveniently be built into the gate circuit 324 to form a unitary structure.

A portion of the current flowing through vacuum tube 33, when it is conducting, is drawn through inductance 34, resistors 7 and 11 and potentiometer 29. For normal operation, as described above, potentiometer 29 is adjusted so that this portion of the current is slightly greater than the current drawn through resistor 7 by vacuum tube 31 when the last-mentioned vacuum tube is conducting in its unblocked or quiescent state, that is with no video input signals present. This results in a lowered voltage indicated by steps N following pulse group D at the anode of vacuum tube 31, during periods when vacuum tube 33 is conducting. This voltage step is amplified in vacuum tube 32 as represented by N' in the anode circuit and N" in the cathode circuit and is passed, via terminals 66, 68 and leads 311, 315 of Fig. 1, on to the vertical deflecting plates A and B of the cathode-ray oscilloscope indicator, where it results in positioning the horizontal sweep of the indicator a discrete distance below the horizontal sweep corresponding to the condition of vacuum tube 31 being conducting, so that the vertical deflections corresponding to echoes received on antenna 320 (Fig. 1) will be positioned along this trace occurring beneath the trace on which the echoes received on antenna 302 are displayed.

One trace being immediately below the other, the two are readily compared and information concerning objects within one or both of the areas covered by the respective antennas is more readily deduced.

The action of the circuit of Fig. 2 will be more readily perceived in connection with the diagrams of Fig. 3, wherein condition A represents the output voltage variations which would prevail at the anode of vacuum tube 31 if the circuit including resistor 11 were omitted. (It is assumed that a group of video pulses similar to V of Fig. 2 are being received.) This is obvious, since with vacuum tube 31 blocked by the voltage drop occurring in the common cathode resistor 6 while vacuum tube 33 is heavily conducting, the anode of tube 31 would rise to and remain at its maximum or cut-off voltage of approximately 15 volts, as indicated by step $N_A$, until vacuum tube 33 was again cut off by the next succeeding negative portion of the gating pulse G.

By adding resistor 11 and potentiometer 29, however, "compensating" current is drawn through resistor 7 and coil 34 when vacuum tube 33 is conducting so that the voltage at the anode of vacuum tube 31 can be adjusted as desired (within wide limits) by potentiometer 29.

Condition B of Fig. 3 represents an adjustment of potentiometer 29 such that with vacuum tube 31 cut off and vacuum tube 33 heavily conducting, the voltage at the anode of vacuum tube 31 remains at its quiescent or standby value, as indicated by line $N_B$.

Finally if potentiometer 29 is adjusted so that current in excess of that necessary to compensate for the blocking of tube 31, is drawn through tube 33, via resistors 7, 11, coil 34 and potentiometer 29, when the latter tube is conducting, condition C prevails in which a negative voltage step $N_C$ is obtained as described above in connection with Fig. 2.

It is thus apparent that the circuit depicter schematically in Fig. 2 constitutes a video gating circuit, that is a circuit carrying video signals in which gating (opening and closing of the circuit) can be effected and in which so-called transient effects (i. e., voltage changes occurring between successive open intervals of the gating circuit) can be accurately controlled or completely eliminated if desired. Heretofore it has been considered necessary to perform such gating functions in a portion of the circuit preceding that in which video frequency signals are present, for example, in prior radar systems if gating is effected it is ordinarily accomplished in the intermediate frequency porton of the circuit, that is a portion of the circuit in which the frequencies are of intermediate value between the radio frequencies of the transmitted and received pulses and the "video" frequencies ultimately applied to the indicator (usually a cathode-ray oscilloscope). By making it entirely feasible to perform the gating function in the video portion of the circuit, the present invention facilitates the redesign of the intermediate frequency portion of the circuit to provide improved discrimination against "jamming" by other radar or radio transmitters which may project energy of approximately the same frequency as is used by the instant radar system toward the receiving antennas 302, 320, of Fig. 1.

Figure 4:
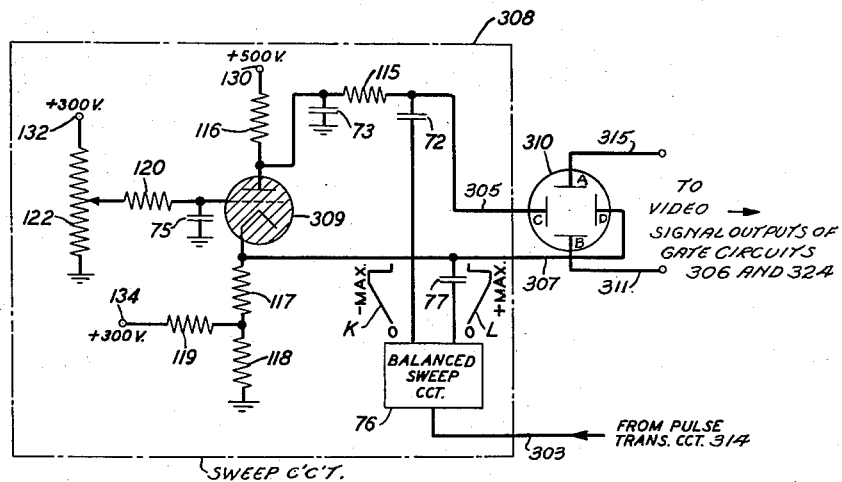

In Fig. 4 more details of the sweep circuit 308 of Fig. 1 are shown. It comprises a balanced sweep circuit 76 of any of the numerous varieties well known in the art which will produce a pair of sweep voltage waves of the type indicated by curves K and L, which are characterized by having equal amplitude and being otherwise identical except that they are opposed (i. e., displaced 180 degrees) in phase with respect to each other. Such balanced sweep waves are commonly employed in the art as they tend to maintain the beam of the cathode-ray oscilloscope more nearly in focus while deflecting it throughout the desired sweep path.

Bridged across the output terminals of sweep circuit 76, as well as across leads 311, 315 to horizontal deflecting plates C, D, of cathode ray oscilloscope 310, is the sweep positioning or deflecting circuit including vacuum tube 309, condensers 7 and 77 being introduced in series with the sweep circuit to isolate the latter from the direct current high voltage supplies used with the circuit of vacuum tube 309. Tube 309 is lightly cross-hatched to denote that it is conducting in its quiescent or standby state.

With no sweep voltage being applied by circuit 76, potentiometer 122 is adjusted to place the ray horizontally on the oscilloscope screen at the point where it is desired that the sweep shall start (for example near the left edge of the screen). For a typical case this adjustment could, for example, be obtained with +150 volts on the cathode and +410 volts on the anode of vacuum tube 309. These voltages would result from sufficient current flowing through the tube and its substantially identical plate and cathode load resistors 116 and 117 to produce a 90-volt drop in each resistor. The low voltage end of resistor 117 is held at a potential of about +60 volts, by voltage divider comprising resistors 118 and 119, so that the average potential of the anode and cathode of vacuum tube 309 is the proper value (approximately 280 volts) for good focusing of the scope.

When the sweep voltages K and L from circuit 76 are applied the rising sweep voltage on the cathode of tube 309 soon cuts off the tube and the impedances of both the anode and cathode circuits of tube 309 become substantially equal to one megohm, which is the value assigned to all three of the resistors 115, 116 and 117. The shunting effect of these circuits on the cathode-ray oscilloscope, therefore, when tube 309 cut off, is obviously, negligibly small and the sweep positioning circuit including tube 309 does not affect the sweeping action, once the positive sweep has reached the value at which vacuum tube 309 is cut off. Condensers 72 and 77 serve, as mentioned above, to isolate the sweep circuit 76 from direct current in the positioning circuit.

At the end of the sweep waves the voltage on the cathode of tube 309 would drop to a value below the +150 volts starting potential if it were not for the action of the tube. However, as soon as the cathode drops to the cut-off potential (slightly above +150 volts as determined by its grid potential) tube 309 starts to conduct and when the voltage drops below +150 volts, the tube draws considerably more anode current. This action prevents the cathode voltage from falling far below the +150 volts starting point. Through this same action (tube 309 conducting) the plate voltage is returned to its +410-volt starting point.

The potential of the control electrode or grid of tube 309, which determines the starting potential of the sweeps, is under control of the "centering" or "positioning" potentiometer 122 by means of which the sweep starting point can be adjusted as desired.

The functions of series resistor 120 and shunting condenser 75 are those of a filter, i. e., they prevent pulse voltages due to pick-up etc., from being applied to the grid of tube 309. Such voltages on the grid of tube 309 would cause "jitter" of the sweeps.

For normal operation the positive terminals of direct current voltage sources are connected to terminals 130, 132 and 134; 500 volts being required at terminal 130 and 300 volts being required at terminals 132 and 134 as indicated in Fig. 3. The negative terminals of all such sources are grounded in accordance with the usual practice in the art.

Numerous other applications of the principles of the invention will readily occur to those skilled in the art. The scope of the invention is defined in the following claims.

What is claimed is:

1. In an object detecting and ranging system means for emitting energy pulses to cover an area to be explored, a first and a second means for receiving and detecting reflections of said emitted pulses from objects within portions of said area, a gate pulse generator, a first and a second electronic gate circuit means positioned electrically in the video frequency output circuits connecting with said first and said second receiving means, respectively, and responsive to the pulses of said gate pulse generator to alternately open said two gate circuits, a sweep positioning electronic circuit means having a control electrode circuit responsive to a direct current voltage normally developed in the anode circuit of said first electronic gate circuit when the latter is open to develop a first pair of initial positioning voltages, a cathode-ray oscilloscope indicator having two pairs of orthogonally arranged deflecting means, one of said pairs of deflecting means connecting to said positioning circuit and the output circuits of both gate circuits and means operative upon the closing of said first gate circuit to alter the direct current voltage effective on the control electrode of said beam positioning electronic circuit means whereby said last stated means develops a second pair of initial positioning voltages, the trace position of the ray of said cathode-ray oscilloscope is shifted when said first gate circuit means is closed and reflections received by said first and said second receiving means will be displayed on traces laterally displaced in juxtaposition with respect to each other.

2. The combination of claim 1 and sweep circuit means connecting to the other of said pairs of orthogonally arranged deflecting means of the cathode-ray oscilloscope, said deflecting means including an electronic positioning circuit establishing a pair of positioning voltages on said other pair of deflecting means during intervals in which the voltage of the sweep circuit means is less than a predetermined amplitude, said electronic positioning circuit being virtually disconnected from the deflecting means when the voltage of the sweep circuit exceeds said predetermined amplitude.

OWEN E. DE LANGE.

REFERENCES CITED

The following references are of record in the file of this patent:

UNITED STATES PATENTS

| Number | Name | Date |
|---|---|---|
| 2,212,558 | Blumlein | Aug. 27, 1940 |
| 2,300,999 | Williams | Nov. 3, 1942 |
| 2,338,395 | Bartelink | Jan. 4, 1944 |
| 2,427,687 | Norgaard | Sept. 23, 1947 |